US012736000B2

(12) United States Patent
Bougelet et al.

(10) Patent No.: US 12,736,000 B2
(45) Date of Patent: Sep. 15, 2026

(54) OIL DEAERATOR DEVICE WITH RESERVOIR PROVIDED WITH A STABILIZING WALL

(71) Applicant: SAFRAN AERO BOOSTERS, Herstal (BE)

(72) Inventors: Stéphane Alain Luc Ghislain Bougelet, Herstal (BE); Charlotte Michelle Frédérique Lambion, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 107 days.

(21) Appl. No.: 18/690,802

(22) PCT Filed: Sep. 14, 2022

(86) PCT No.: PCT/EP2022/075535
§ 371 (c)(1),
(2) Date: Sep. 30, 2024

(87) PCT Pub. No.: WO2023/041585
PCT Pub. Date: Mar. 23, 2023

(65) Prior Publication Data

US 2025/0297562 A1 Sep. 25, 2025

(30) Foreign Application Priority Data

Sep. 14, 2021 (BE) .................................. 2021/5716

(51) Int. Cl.
*F01M 11/03* (2006.01)
*B01D 19/00* (2006.01)
*F01M 11/00* (2006.01)

(52) U.S. Cl.
CPC ......... *F01M 11/03* (2013.01); *B01D 19/0057* (2013.01); *F01M 2011/0029* (2013.01); *F01M 2011/038* (2013.01)

(58) Field of Classification Search
CPC .. B01D 19/0057; B01D 19/02; B01D 36/001; F01M 2011/038; F01M 2013/0427; F16N 39/002
See application file for complete search history.

(56) References Cited

U.S. PATENT DOCUMENTS 2,016,642 A * 10/1935 Lincoln .............. B01D 19/0057 210/183
2,952,330 A * 9/1960 Winslow ............ B01D 19/0052 55/459.1

(Continued)

FOREIGN PATENT DOCUMENTS

FR 3095766 A1 11/2020

OTHER PUBLICATIONS

International Search Report to corresponding PCT/EP2022/075535 mailed on Dec. 23, 2022.

(Continued)

*Primary Examiner* — Minh Truong
(74) *Attorney, Agent, or Firm* — Sandberg Phoenix & von Gontard P.C.

(57) ABSTRACT

An oil deaeration device for a turbomachine lubrication system, comprising a tank comprising an internal volume with a bottom, an oil outlet on the bottom, and an oil inlet opposite the bottom; an oil deaerator provided at the oil inlet of the tank; and a stabilizing wall arranged in the internal volume facing the bottom and provided with at least one passage for the oil, so as to delimit a volume d stabilized buffer oil.

14 Claims, 1 Drawing Sheet

(56) References Cited

U.S. PATENT DOCUMENTS

| | | | | |
|---|---|---|---|---|
| 3,822,533 | A * | 7/1974 | Oranje | B01D 45/16 55/394 |
| 4,305,825 | A * | 12/1981 | Laval, Jr. | B04C 5/103 210/512.1 |
| 6,231,645 | B1 * | 5/2001 | Conrad | B04C 5/187 95/271 |
| 7,335,313 | B2 * | 2/2008 | Moya | B04C 5/13 210/512.1 |
| 7,401,599 | B2 * | 7/2008 | Saito | B04C 5/185 123/518 |
| 7,867,310 | B2 * | 1/2011 | Baten | B04C 5/12 55/455 |
| 8,110,024 | B2 * | 2/2012 | Folkvang | B04C 5/103 96/182 |
| 11,692,669 | B2 * | 7/2023 | Schetzel | F02C 7/06 95/261 |
| 2010/0065374 | A1 * | 3/2010 | Szolomayer | F01M 11/067 700/282 |
| 2019/0338670 | A1 * | 11/2019 | Reid | B01D 19/0057 |
| 2021/0170318 | A1 * | 6/2021 | Lu | B01D 45/16 |
| 2023/0160322 | A1 * | 5/2023 | Raimarckers | F01D 25/18 184/6.11 |

OTHER PUBLICATIONS

Written Opinion to corresponding PCT/EP2022/075535 mailed on Dec. 23, 2022.

* cited by examiner

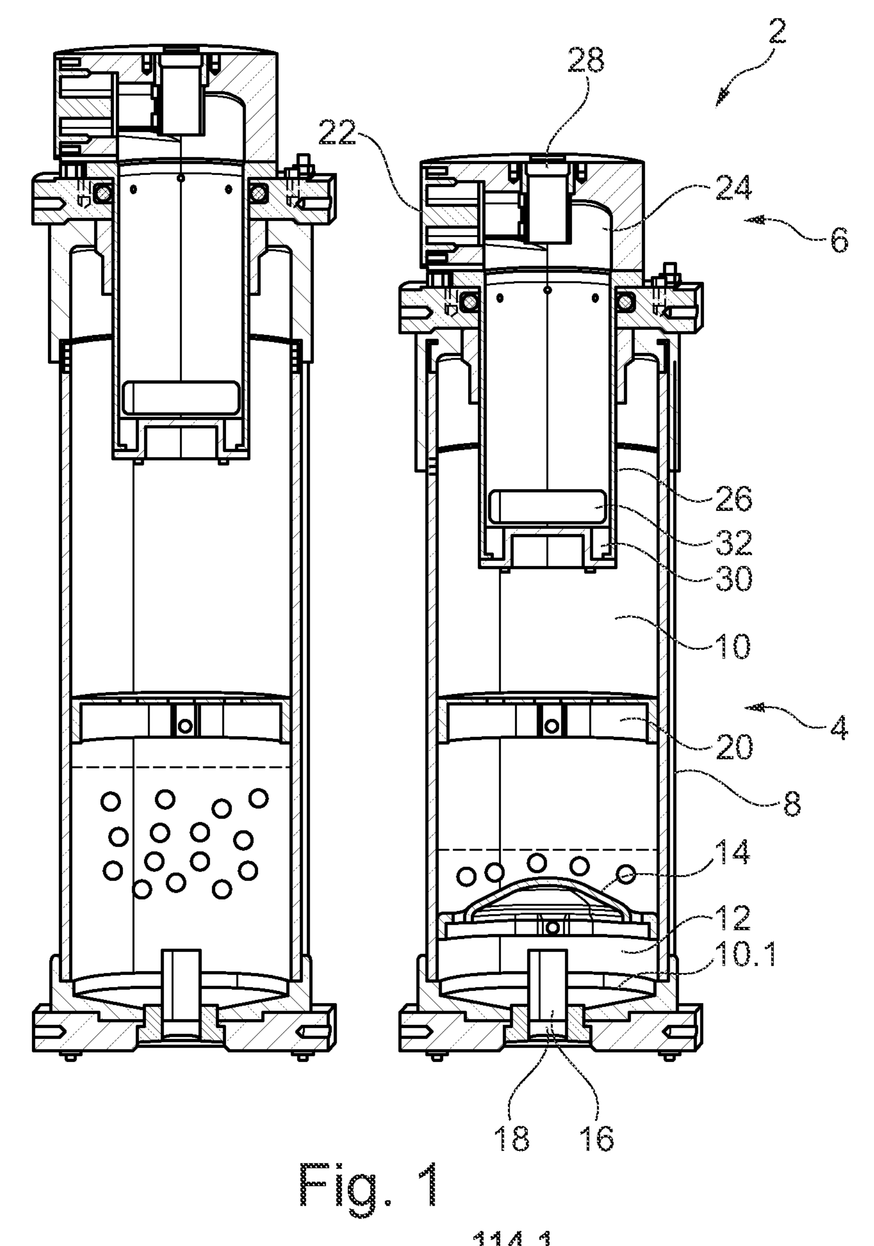
Fig. 1
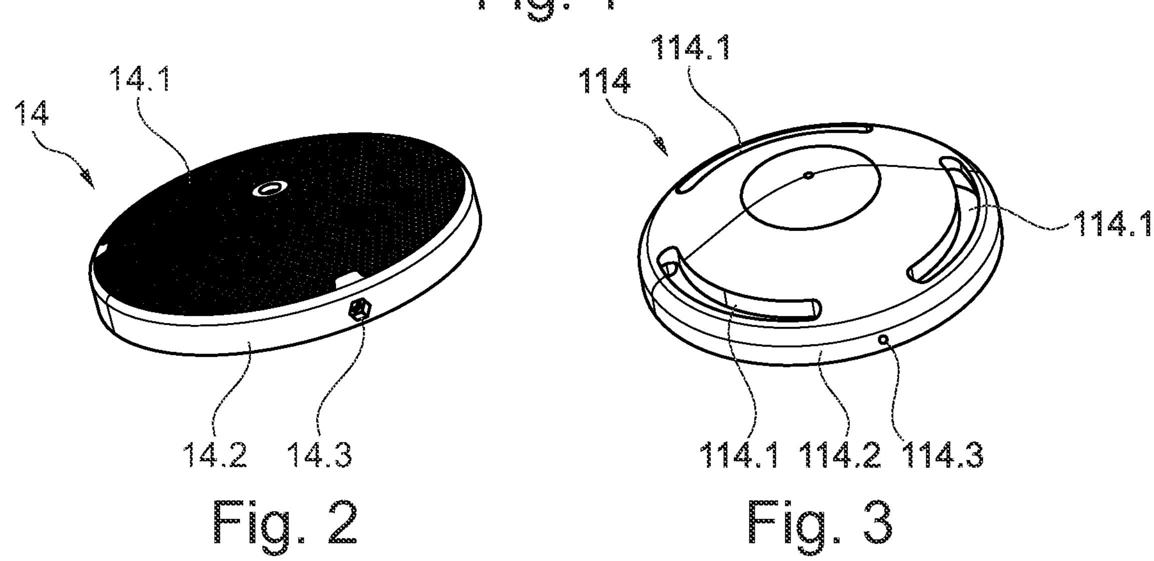
Fig. 2
Fig. 3

OIL DEAERATOR DEVICE WITH RESERVOIR PROVIDED WITH A STABILIZING WALL

CROSS-REFERENCE TO RELATED APPLICATIONS

The present invention is the US national stage under 35 U.S.C. § 371 of International Application No. PCT/EP2022/075535 which was filed on Sep. 14, 2022, which claims priority of Application BE 2021/5716 filed Sep. 14, 2021, the contents of which (text, drawings and claims) are incorporated here by reference in its entirety.

FIELD

The invention relates to the field of lubrication, more particularly the lubrication of engines, more particularly the lubrication of turbomachines, in particular aircraft.

BACKGROUND

The lubrication systems for turbomachines, in particular aircraft turbomachines, essentially and conventionally comprise one or more oil recovery pumps of the turbomachine, an oil storage device with a reservoir and one or more oil recovery pumps. oil supply to the turbomachine. The oil storage device conventionally comprises an oil deaerator at the inlet of the tank, in order to separate the air contained in the oil. The lubrication chambers of a turbomachine in fact work with oil mists comprising air, so that the oil conveyed to the oil storage device includes air and must be deaerated before being released. be reinjected into the lubrication chambers by the supply pump(s).

The published patent document EP 3 150 265 A1 discloses an oil deaerator device for a turbomachine lubrication system, comprising a reservoir and an oil deaerator of a particular type, namely with a rotor driven by the flow air-laden oil supply.

More traditional oil deaerators are of the cyclone type, where the mixture of oil and air follows a spiral path, the oil being projected against a generally cylindrical wall and flowing towards the tank by gravity, and the air exhausting centrally upwards.

The oil flowing from the oil deaerator to the tank, although mostly deaerated, may still include some air, so a buffer volume in the bottom of the tank is necessary to allow final deaeration. It is in fact important that the oil leaving the tank and conveyed to the turbomachine by the circulation pump(s) is free of air. This buffer volume, to ensure this function, often turns out to be large and requires a large tank size.

SUMMARY

The invention aims to overcome at least one drawback of the aforementioned state of the art. More particularly, the invention aims to propose an oil deaeration device for a lubrication system, which is more compact.

The subject of the invention is an oil tank for a turbomachine lubrication system, comprising: an internal volume with a bottom, an oil outlet, and an oil inlet; wherein the oil tank further comprises a stabilizing wall arranged in the internal volume facing the bottom and provided with at least one passage for the oil, so as to delimit a volume of stabilized buffer oil.

Advantageously, the oil outlet is located at a lower part of the internal volume, when the tank is in the operational position. Advantageously, the oil outlet is located on the bottom or adjacent to the bottom.

Advantageously, the oil inlet is opposite the bottom.

According to an exemplary advantageous embodiment of the invention, the at least one passage for the oil in the stabilizing wall forms a total passage section for the oil of less than 60%, in various instances less than 50%, for example less than 40%. %, of a total section of the stabilizing wall.

According to an exemplary advantageous embodiment of the invention, the at least one passage for the oil in the stabilizing wall forms a total passage section for the oil greater than 1%, in various instances greater than 5%, of a total section of the stabilizing wall.

According to an exemplary advantageous embodiment of the invention, the at least one oil passage in the stabilizing wall comprises a limited number of the at least one oil passage, greater than 2 and/or less than 10.

According to an exemplary advantageous embodiment of the invention, the limited number of oil passages are arranged along the periphery of the stabilizing wall.

According to an exemplary advantageous embodiment of the invention, the limited number of oil passages arranged along the periphery of the stabilizing wall each have an oblong shape along the periphery.

According to an exemplary advantageous embodiment of the invention, the at least one passage for oil in the stabilizing wall comprises a high number of the at least one passage for oil, greater than 30, in various instances greater than 50, the passages for the oil being in various instances distributed homogeneously on the stabilizing wall or one or more parts of the stabilizing wall.

According to an exemplary advantageous embodiment of the invention, the stabilizing wall is curved in the shape of a dome with a concavity of the dome facing the bottom.

Advantageously, the stabilizing wall is flat.

According to an exemplary advantageous embodiment of the invention, the oil tank further comprises a strainer projecting from the bottom, forming the oil outlet.

According to an exemplary advantageous embodiment of the invention, the strainer is aligned with the dome shape of the stabilizing wall.

According to an exemplary advantageous embodiment of the invention, the stabilizing wall has an average diameter and is at an average distance from the bottom equal to or less than 60%, in various instances 50%, of the average diameter.

According to an exemplary advantageous embodiment of the invention, at least 80% of the internal volume corresponds to a constant cross section extending in a longitudinal direction of the internal volume.

Advantageously, the oil tank comprises one or more walls delimiting the internal volume, the wall or walls being metallic. This or these walls can be produced in particular by aluminum casting, by mechanically welded assembly or by additive manufacturing.

Advantageously, the wall(s) of the tank comprise two parts assembled to one another, in particular by flanges, the stabilizing wall being located between the two parts.

The invention also relates to an oil deaeration device comprising an oil tank according to the invention and an oil deaerator at the oil inlet of the oil tank.

According to an exemplary advantageous embodiment of the invention, the oil deaerator is of the cyclonic type with a tubular wall inserted longitudinally in the tank.

According to an exemplary advantageous embodiment of the invention, the internal volume is free of filter element between the oil deaerator and the stabilizing wall.

The measures of the invention are interesting in that they make it possible to reduce the oil buffer volume while improving the separation of air from the oil. Reducing the oil buffer volume also makes it possible to reduce the size of the tank and, therefore, of the oil deaeration device.

DRAWINGS

FIG. 1 is an exemplary sectional view of an oil deaeration device for a lubrication system according to the state of the art (left) and according to the invention (right).

FIG. 2 exemplarily illustrates in perspective a stabilizing wall according to a first embodiment of the invention.

FIG. 3 exemplarily illustrates in perspective a stabilizing wall according to a second embodiment of the invention.

DETAILED DESCRIPTION

FIG. 1, in the illustration on the right, a sectional view of an oil deaeration device with an oil tank, for a lubrication system, according to the invention. The illustration on the left is an oil deaeration device with an oil reservoir, for a lubrication system, according to the state of the art.

The oil deaeration device 2, according to the invention, essentially comprises an oil tank 4, according to the invention, and an oil deaerator 6 arranged at the inlet of the oil tank 4.

The oil tank 4 comprises a wall 8, in this case generally cylindrical, it being understood that other shapes are possible. The wall 8 advantageously extends in a longitudinal direction, corresponding to a vertical direction in FIG. 1. The wall 8 delimits an internal volume 10 of the oil tank 4. The internal volume 10 in question comprises a bottom 10.1 intended to receive an oil buffer volume 12. The latter is delimited not only by the bottom 10.1 of the internal volume 10 but also by a stabilizing wall 14 arranged opposite the bottom 10.1. This stabilizing wall 14 is fixed against an internal face of the wall 8 so as to separate the oil buffer volume 12 from the rest of the internal volume 10 of the oil tank 4. The stabilizing wall 14 comprises one or more passages for the oil so as to allow a transfer by gravity of the oil coming from the oil deaerator 6 towards the oil buffer volume 12. These oil passages are however dimensioned so that the stabilizing wall forms a barrier to the oil, capable of stabilizing the oil during movements of the oil tank 4, while allowing the transfer of the oil to the oil buffer volume 12. For this purpose, the oil passages form a section of total passage for oil which is less than 60%, in various instances less than 50%, for example more less than 40%, to the total section of the stabilizing wall, and greater than 1%, in various instances greater than 5%, of the total section of the stabilizing wall. The shape and distribution of the oil passages of the stabilizing wall 14 will be detailed later in relation to FIGS. 2 and 3.

The stabilizing wall 14 is advantageously located at a reduced distance from the bottom 10.1 of the internal volume 10, namely at an average distance less than 60%, in various instances 50%, of an average diameter of the stabilizing wall 14. This distance is to be considered in a direction parallel to the longitudinal axis of the oil tank 4 and between the faces facing the stabilizing wall 14 and the bottom 10.1 of the internal volume 10. This reduced distance makes it possible to reduce the volume oil buffer volume 12 while retaining a function of final deaeration of the oil coming from the inlet of the oil tank, in this case from the oil deaerator 6.

The oil tank 4 can also include a strainer 16 projecting from the bottom 10.1 of the internal volume 10, this strainer being in fluid communication with the outlet 18 of the oil tank 4.

As is visible in FIG. 1, the stabilizing wall 14 can have a curved profile, in the shape of a dome with concavity oriented towards the bottom 10.1 of the internal volume 10. The strainer 16, aligned with the longitudinal axis, is advantageously aligned with the dome shape of the stabilizing wall 14. Alternatively, the stabilizing wall 14 can have a flat profile.

The oil tank 4 can comprise an intermediate wall 20 disposed in the internal volume 10 between the stabilizing wall 14 and the oil inlet, in this case the oil deaerator 6. This intermediate wall 20 is perforated by so as to allow a transfer of the oil by gravity from the inlet of the oil tank 4, in this case from the oil deaerator 6, towards the bottom 10.1 of the internal volume 10. The total passage section of the openings is advantageously greater than the total passage section of the oil passages of the stabilizing wall 14.

The oil deaerator 6 is attached to the oil tank 4 at the oil inlet located opposite the bottom 10.1 of the internal volume 10. The oil deaerator 6 includes an oil inlet 22 and a chamber cyclonic chamber 24 directly downstream of the oil inlet 22. The cyclonic chamber is generally cylindrical along an axis aligned or parallel to the longitudinal axis of the tank 4. It is however understood that a slight inclination relative to the axis longitudinal is possible, for example up to 20°. The oil passage between the oil inlet 22 and the cyclone chamber 24 is in a transverse direction, advantageously perpendicular to the axis of the cyclone chamber in question. This passage is advantageously in a direction tangential to the cyclonic chamber 24 so as to give the flow of air-laden oil a circular spiral path along the interior wall of the cyclonic chamber 24. By this means, the oil is projected by centrifugal effect against the interior wall of the cyclonic chamber 24 along the tube 26 extending the cyclonic chamber 24 in question, while the air, lighter, rises axially towards the air outlet 28. The oil projected against the interior wall of the cyclone chamber 24, along the tube 26, flows by gravity into a settling basin 30. The latter is annular and aligned with the interior wall of the cyclone chamber 24 so as to directly collect the oil flowing by gravity along the interior wall in question. The tube 26 comprises at least one port 32 located in height relative to the bottom of the settling basin, so as to allow the oil to flow from the settling basin, by overflowing through the at least one port 32. L The oil then flows, from the tube 26, into the internal volume 10 towards the possible intermediate wall 20 and towards the stabilizing wall 14.

The oil in contact with the stabilizing wall 14 then flows along the wall until it encounters one or more oil passages and flows into the oil buffer volume 12. When the oil level exceeds the stabilizing wall 14, for example when it is at a level located between the stabilizing wall 14 and the intermediate wall 20, the layer of oil located above the stabilizing wall 14 is potentially subject to instability in that it can be agitated due to vibrations coming from the turbomachine and/or the aircraft on which the oil deaeration device is mounted and also in that it receives the oil flows from the oil deaerator 6, possibly via the intermediate wall 20, while the layer located under the stabilizing wall 14, namely the oil buffer volume 12, is stabilized with respect to the two sources of instability mentioned above and can thus free itself from any remaining air and avoid any incorporation of air.

The left illustration of FIG. 1 shows an oil deaeration device with an oil tank according to the state of the art and similar to that of the right illustration according to the invention. The oil tank according to the state of the art does not include the stabilizing wall 14 according to the invention. A minimum oil level is shown in broken lines. We observe that it is significantly higher in the oil tank according to the invention, essentially in that the zone of turbulence, schematized with the presence of air bubbles, is thicker.

FIGS. 2 and 3 illustrate the stabilizing wall 14 according to two embodiments.

The stabilizing wall 14 in FIG. 2 is according to a first embodiment of the invention. The stabilizing wall 14 has a curved dome-shaped profile, as described in relation to FIG. 1. It comprises in this case a large number of passages for the oil 14.1 of reduced passage section, distributed evenly over the extent of the stabilizing wall 14. This comprises at its periphery a mounting face 14.2, advantageously cylindrical, intended to contact the internal face of the tank wall. This mounting face 14.2 can include lugs and/or cavities 14.3 intended to engage with corresponding cavities and/or lugs formed on the internal face of the tank wall.

The stabilizing wall 114 in FIG. 3 is according to a second embodiment of the invention. The reference numbers of the first embodiment are used to designate identical or corresponding elements, these numbers being however increased by 100. Reference is also made to the description of these elements in the context of the first embodiment.

The stabilizing wall 114 of the second embodiment differs from that of the first embodiment, essentially in that the passages for the oil through the wall in question are no longer a large number of passages for the oil. reduced passage section, but a limited number of passages for the oil, with a larger passage section. In this case, the limited number is three and the passages for the oil 114.1 are oblong along the edge of the mounting face 114.2 of the stabilizing wall 114. It is understood that the limited number of passages for the oil can vary by the number three, for example be one, two, four, five or more. Advantageously, this limited number is less than or equal to ten.

In the two embodiments described above, the passage(s) for the oil form a total or equivalent passage section for the oil, which is less than 60%, in various instances less than 50%, for example less than 40%. %, of the total section of the stabilization wall, and greater than 1%, in various instances greater than 5%, to the total section of the stabilization wall.

What is claimed is:

1. An oil tank for a turbomachine lubrication system, said oil tank comprising:
- an internal volume with a bottom, an oil outlet, and an oil inlet;
- a stabilizing wall arranged in the internal volume facing the bottom and provided with at least one passage for the oil through said stabilizing wall, so as to delimit a stabilized volume of buffer oil;
- wherein the stabilizing wall is fixed to an internal face of a tank wall delimiting the internal volume;
- wherein the stabilizing wall has a diameter defined by a diameter of a peripheral mounting face of the stabilizing wall contacting the inner face of the tank wall, the stabilizing wall being curved to have a dome shape with a concavity of the dome facing the bottom; and
- wherein a distance from the stabilizing wall to the bottom is measured parallel to a longitudinal axis of the internal volume between facing surfaces of the stabilizing wall and the bottom, and said distance is equal to or less than 60% of the diameter.

2. The oil tank according to claim 1, wherein the at least one oil passage in the stabilizing wall forms a total passage section for the oil that is lower than 60% of a total section of the stabilizing wall.

3. The oil tank according to claim 1, wherein the at least one oil passage in the stabilizing wall forms a total passage section for oil greater than 1% of a total section of the stabilizing wall.

4. The oil tank according to claim 1, wherein the at least one oil passage in the stabilizing wall comprises a limited number of the at least one passage for oil, at least one of greater than 2 and less than 10.

5. The oil tank according to claim 4, wherein the limited number of oil passages are arranged along a periphery of the stabilizing wall.

6. The oil tank according to claim 5, wherein the limited number of oil passages arranged along the periphery of the stabilizing wall each have an oblong shape along the periphery.

7. The oil tank according to claim 1, wherein the at least one passage for oil in the stabilizing wall comprises a high number of the at least one passage for oil, greater than 30, the oil passages being distributed homogeneously on the stabilizing wall or one or more parts of the stabilizing wall.

8. The oil tank according to claim 1, wherein the oil tank further comprising a strainer projecting from the bottom, forming the oil outlet.

9. The oil tank according to claim 8, wherein the strainer is aligned with the dome shape of the stabilizing wall.

10. The oil tank according to claim 1, wherein the distance from the stabilizing wall to the bottom is equal to or less than 50% of the diameter of the stabilizing wall.

11. The oil tank according to claim 1, wherein at least 80% of the internal volume corresponds to a constant cross section extending in a longitudinal direction of the internal volume.

12. An oil deaeration device, said oil deaeration device comprising:
- an oil tank for a turbomachine lubrication system, the oil tank comprising:
  - an internal volume with a bottom, an oil outlet, and an oil inlet;
  - a stabilizing wall arranged in the internal volume facing the bottom and provided with at least one passage for the oil through the stabilizing wall, so as to delimit a stabilized volume of buffer oil;
  - wherein the stabilizing wall is fixed to an internal face of a tank wall delimiting the internal volume;
  - wherein the stabilizing wall has a diameter defined by a diameter of a peripheral mounting face of the stabilizing wall contacting the inner face of the tank wall, said stabilizing wall being curved in the shape of a dome with a concavity of the dome facing the bottom; and
  - wherein a distance from the stabilizing wall to the bottom is measured parallel to a longitudinal axis of the internal volume between facing surfaces of the stabilizing wall and the bottom, and said distance is equal to or less than 60% of the diameter,
  - and the oil deaeration device comprising an oil deaerator at the oil inlet of the oil tank.

13. The oil deaeration device according to claim 12, wherein the oil deaerator is of the cyclonic type with a tubular wall inserted longitudinally in the tank.

14. The oil deaeration device according to claim 12, wherein the internal volume is free of filter element between the oil deaerator and the stabilizing wall.

* * * * *